March 13, 1934.　　　H. A. DOUGLAS　　　1,950,716
ELECTRIC SWITCH
Filed Oct. 14, 1931　　　2 Sheets-Sheet 1
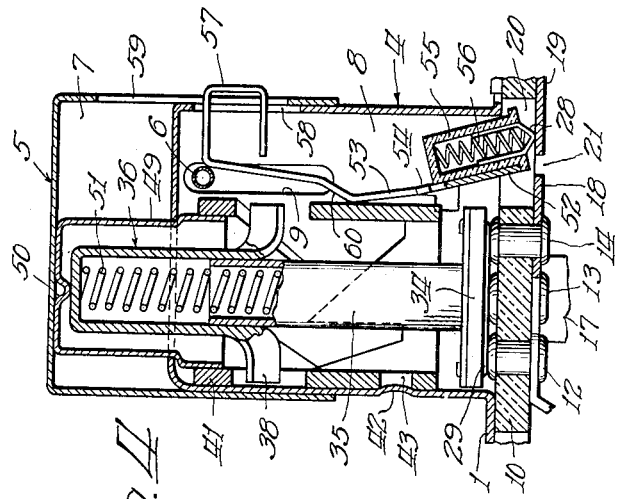
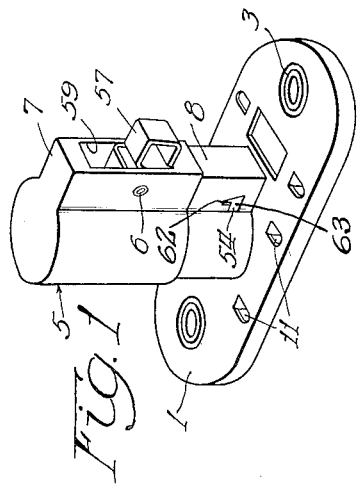
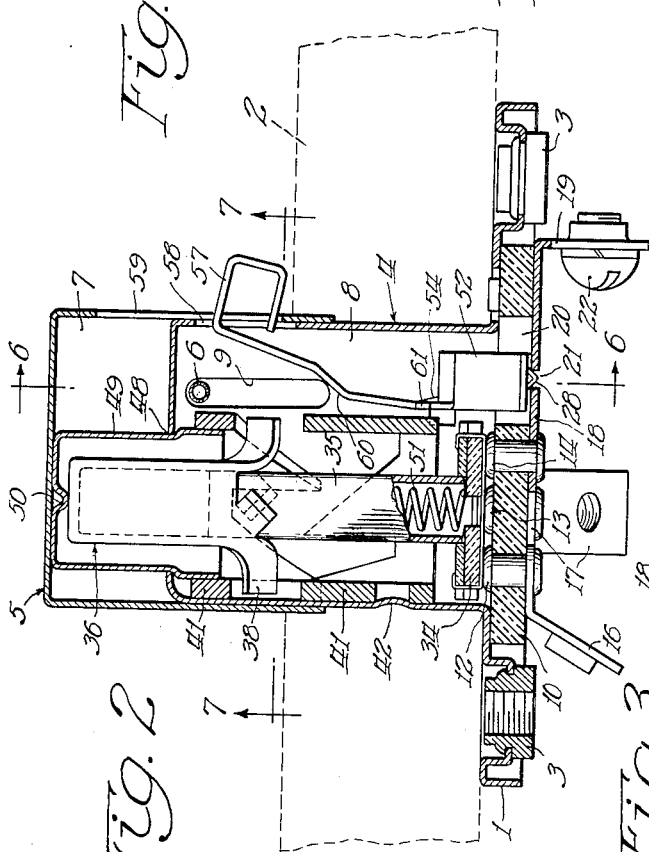
Inventor
Harry A. Douglas
By Langdon Moore Atty.

March 13, 1934.  H. A. DOUGLAS  1,950,716
ELECTRIC SWITCH
Filed Oct. 14, 1931  2 Sheets-Sheet 2
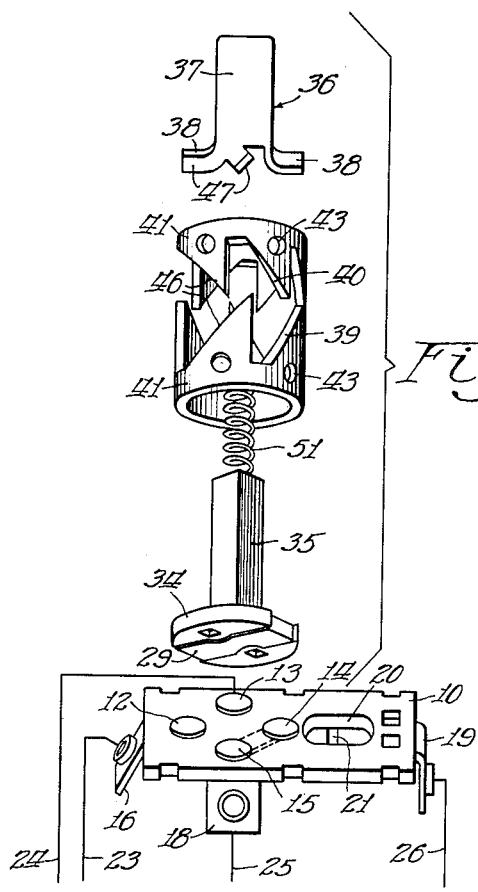
Inventor
Harry A. Douglas
By Langdon Moore
Atty.

Patented Mar. 13, 1934

1,950,716

UNITED STATES PATENT OFFICE 1,950,716

ELECTRIC SWITCH

Harry A. Douglas, Bronson, Mich.

Application October 14, 1931, Serial No. 568,669

12 Claims. (Cl. 200—11)

This invention relates to electric switches and more particularly to switches operable to open and close a plurality of electric circuits consecutively and in uninterrupted sequences of cycles of operation, the means for opening and closing the circuits being responsive to a member having uniform motion.

In connection with a suitable source of electric current, the invention is desirably inclusive of switching mechanism for interrupting the circuits through the source of current and means actuated automatically upon movement of the member having uniform motion to continue the circuits through said source of current.

The invention is of particular utility in connection with a foot operated switch which may be placed upon the dash board of a motor vehicle, for example, to control the driving lights of the vehicle, so that the hands of the operator may be left entirely free for other operations.

The invention will be understood by reference to the illustrative embodiment thereof shown in the accompanying drawings in which—

Figure 1 is a perspective view of a preferred form of mechanism embodying the invention;

Figure 2 is an axial sectional view of the structure shown in Figure 1, on a somewhat larger scale;

Figure 3 is a bottom plan view of the structure of Figure 2;

Figure 4 is a view similar to Figure 2, but with the switching mechanism in another position;

Figure 5 is a view of some of the parts of the structure of Figure 1 in separated relation;

Figure 6 is a vertical section taken on the line 6—6 of Figure 2;

Figure 7 is a transverse section taken on the line 7—7 of Figure 2;

Figure 8 is a projected view on a single plane of some of the parts shown in Figure 5; and Figure 9 is a view showing diagrammatically the switch of the invention applied to the floor board of an automobile and illustrative circuits controlled thereby.

Referring in detail to the figures of the drawings, I have shown the invention exemplified in a structure having a metal base 1. This base may be secured to the underside of a floor board 2 (Figure 9) of a motor vehicle, the base being secured by means of bolts (not shown) passing through the floor board and the tapped bushings 3 riveted in the base.

In the illustrative construction, the base 1 is shown having extending integrally therefrom a turret 4. Sliding upon the turret in telescoping relation therewith is a depressible member represented by the cap 5 which has telescoping relation with the turret. An aperture 5a in the floor board is large enough to receive both the turret and the cap. A tubular crosspiece 6 has its ends riveted to the sides of a lateral extension 7 of the cap and spans the said extension midway thereof. The extension 7 of the cap receives a similarly formed extension 8 of the turret 4 through which the crosspiece 6 passes having limited vertical movement in closed slots 9 in the sides of the lateral extension 8 of the turret which are between the sides of the extension 7 of the cap, thus limiting the movement of the cap outwardly of the turret.

The base 1 houses an insulating block 10 which may be secured to the base as by means of lugs 11 struck from the metal of the base. The insulating block carries a plurality of metallic contact members constituting in this instance the contacts 12, 13, 14 and 15. The contacts are arranged in pairs (Fig. 5), each pair constituting the terminals of an electric circuit, and are grouped about a common center as by being radially disposed thereabout, the contacts of a pair being disposed on diametrically opposite sides of the said center. The contacts 12 and 14 thus constitute one pair of terminals and the contacts 13 and 15 another pair.

The contact members 12 and 13 each rivet to the underside of the insulating block 10 metallic terminal members 16 and 17 respectively, while the contact members 14 and 15 rivet to the block a single metallic terminal member 18 which electrically connects the two contacts 14 and 15. A terminal member 19 is also appropriately secured to the underside of the insulating block 10 in spaced relation to the terminal member 18, the block 10 being discontinued by an aperture 20 opposite the gap 21 between the terminals 18 and 19.

Binding screws such as the screws 22 in cooperation with the terminal members connect mechanically and electrically to the terminal members 16, 17, 18 and 19, the insulated lead wires 23, 24, 25 and 26, respectively.

Each of the electric circuits illustrated may include a source of current such as the battery 27 (Fig. 9) to one side of which may be connected the lead 26, the other side of the battery being conveniently grounded on the metal frame of the automobile. By means of a current conducting switch member 28 adapted to connect the terminal members 18 and 19, the contacts 14 and 15 may be placed simultaneously in electrical connection with the battery 27, through the common terminal member 18.

In accordance with my invention, I provide a current conducting bridge here represented by the metallic wiper 29 which is adapted for selectively connecting the contacts of the pairs of contacts, that is the contacts 12 and 14 may be electrically connected by the wiper 29 or the contacts 13 and 15 may be connected. When the contacts 12 and 14 are connected by the wiper 29 (assuming the switch member 28 be in circuit continuing position, as shown in Fig. 2), a circuit is established through the grounded battery 27, lead 26, lead 23 and each of the grounded filaments 30 of the head lamps 31. The filaments 30 may constitute, say, the normal driving lights of the vehicle, by being placed in the focus of the lamps 31. Similarly, when the contacts 13 and 15 are connected by the wiper 29, a circuit is established through the grounded battery 27, lead 26, lead 24, and each of the grounded filaments 32 of the head lamps 31. The filaments 32 may be the intermediate driving lights of the vehicle by being placed slightly above the focus of the lamps 31 so that, although they may be of equal candle power with the filaments 30, their rays will be deflected downwardly so as not to dazzle the eyes of the driver of an approaching car.

It is desirable that the tail lamp 33 should be lighted when either the normal or intermediate driving lights of the car are in circuit, and as here shown, whenever the switch member 28 is in circuit continuing position in addition to the circuits already described, a circuit is established through the grounded battery, lead 26, terminal members 19 and 18, lead 25, and the grounded filament (not shown) of the tail lamp.

The wiper 29 is desirably wide enough so that the connection between one pair of contacts, say 12 and 14, is not broken until a circuit is established through another pair 13 and 15, so that either the filaments 30 or 32 will glow continuously in any position of the wiper 29, provided the switch member 28 is in circuit closing position, thus insuring that the headlights will not go out during the change from one filament to the other.

In accordance with one aspect of the invention, the current conducting bridge or wiper 29 is rotatable in a substantially fixed plane and the cap 5 is reciprocable parallel to the axis of rotation of the wiper 29, and means are provided for transforming the reciprocable movement of the cap into rotary motion to rotate the wiper upon reciprocation of the cap in either direction.

The wiper 29 is adapted to be rotated on an axis coincident with the center about which the contacts 12, 13, 14 and 15 are arranged. As here shown, the wiper which is in the form of a thin strip of metal diametrically fixed by suitable means upon an insulating disc 34. The disc 34 is in turn fixed to the lower end of a square hollow shaft 35 coaxially therewith. The shaft 35 is in telescoping relation with a hollow cam follower 36. The follower 36 has a shaftlike portion 37 which is square in cross section and is closed at one end and this portion of the follower receives the shaft 35 with a snug sliding fit. The follower, therefore, can reciprocate on the shaft 35, but will cause the shaft to rotate with it on an axis which is common to the follower and to the wiper 29. Extending laterally from the open end of the shaft portion 37 are, in this instance, four radial follower fingers 38, spaced ninety degrees apart around the follower. These fingers project into a cam path formed by the opposed cam surfaces 39 and 40. These cam surfaces may be conveniently produced by suitably cutting the opposing ends of two cylindrical members 41, thus making each cam surface continuous. The cylindrical members 41 may be secured about the axis referred to by staking them as at 42 to the inner walls of the turret 4, holes 43 being produced in the cylindrical members 41 to receive the indented portions 42 of the turret.

Each cam surface 39 and 40 has a series of hills 44 and valleys 45 and the hills and valleys of the two surfaces are staggered, that is a hill 44 of one cam surface is opposite and substantially midway between a hill 44 and a valley 45 of the other cam surface. Each hill and valley provides an inclined slope 46 and the follower fingers 38 have surfaces 47 which are oblique with respect to the axis of the fingers and which slide upon the inclines 46 of the cam surface 39. Since the inclines of both cam surfaces face in the same direction and are alternately arranged, reciprocation of the follower 36 in one direction will cause the fingers 38 to slide along the inclines 46 of the cam surface 39. During this movement of the follower parallel to its axis, the fingers 38 will be given an angular movement by sliding along the inclines 46 and the follower will be partially rotated. Reciprocation of the follower in the opposite direction will cause the fingers to leave the inclines 46 of the cam surface 39 and to engage the inclines 46 of the cam surface 40 when the follower will be further rotated. Regardless, therefore, of which direction the follower is moved, it will upon any movement be partially rotated in the same direction and consequently the wiper 29 will also be rotated in the same direction.

The closed end of the follower 36 projects through an opening 48 in the top of the turret 4. I provide in this instance that the cap 5 moves the follower through the intermediation of the plunger 49 which also reciprocates in this opening and contacts with the follower 36 preferably at a single point such as the small internal boss 50 contacting centrally with the closed end of the follower. Thus friction between the plunger 49 and the follower 36 is minimized, it being borne in mind that the plunger need have only reciprocatory motion, while the follower has both reciprocatory and rotary motion.

The plunger is conveniently covered by and may be in effect an operative part of the cap 5. So constructed and arranged the cup, plunger and follower can reciprocate together with respect to the turret 4, the limit of movement of these parts in either direction being determined in one instance by the crosspiece 6 which slides in the slots 9 in the walls of the turret. The cap and plunger are normally maintained at the limit of outward movement with respect to the turret by a coil spring 51 enclosed jointly by the hollow telescoping shaft 35 and follower 36 and pressing these members apart. The spring 51 also serves to maintain the disc 34 pressed against the contacts 12, 13, 14 and 15, so that the wiper 29 is in electrical connection at all times with at least two of the contacts.

In the normal or outermost position of the cam follower 36, in which it is placed by the action of the spring 51, the wiper 29 is arranged to bridge one of the pairs of contacts 12, 14 or 13, 15 without engaging the other pair. If, as already described the wiper 29 bridges contacts 12 and 14, then the normal driving lights of the car are on. If, now the cap 5 be depressed by the foot of the driver, thus moving the follower 36 toward the disc 34, the inclines 46 of the cam surfaces 39 will rotate the follower 36 through an angle of approximately forty-five degrees. Since the contacts 12 and 13, for example, are in this instance ninety degrees apart, the wiper 29 will then occupy a position midway between the contacts 12 and 13 and midway between the contacts 14 and 15. In this position of the wiper, both the normal driving lights and the intermediate driving lights of the car will be on, since the wiper electrically connects both pairs of contacts 12, 14 and 13, 15. When the driver takes his foot off the cap 5, the spring 51 retracts the follower 36, and with it the plunger 49, the movement of the follower in this direction away from the disc 34, causing the follower to be rotated, by engagement of the fingers 38 with the inclines 46 of the opposed cam surface 40 another forty-five degrees, which places the wiper 29 in electrical bridging connection with the contacts 13 and 15 only, so that the normal driving lights of the car are extinguished and the intermediate driving lights are on. When the driver wishes to change back again to the normal driving lights of the car he repeats the operation just described. Thus by operation of the cap 5 with a uniform motion, the two circuits described may be successively opened and closed in uninterrupted sequences of cycles of operation, and the bridge member may be left in either operative position.

When it is desired to extinguish both of the driving lights, the source of current or battery 27 may be disconnected from the contacts 12, 13, 14 and 15 by movement of the current conducting switch member 28 out of contact with the terminal members 18 and 19, thus discontinuing the circuit therethrough.

In the present exemplification of the invention, the metal switch member 28, (Figs. 2 and 4) which has a tapered nose to fit readily into the gap 21 between the terminal members 18 and 19, is carried by the foot 52 of a lever 53 which is housed by the extension 8 of the turret 4 and which is pivoted at 54 in the walls of the turret. The switch member 28 is surrounded except at its nose with an insulating spring barrel 55 in which the member 28 has telescoping relation. The member 28 and insulating spring barrel jointly enclose a light coil spring 56 which urges the member 28 outwardly and, in the position of the switch shown in Figure 2, presses the nose of the member 28 into the gap 21, the foot 52 of the lever 53 lying in the aperture 20 in the insulating base block 10. The upper end 57 of the lever 53 protrudes through an opening 58 in the walls of the turret and through a slot 59 in the cap 5. The upper end 57 of the lever 53 may therefore be kicked inwardly with the side of the foot of the driver. Upon this movement of the lever the switch member 28 will be moved out of the gap 21 and into the position shown in Figure 4, where it rests upon the terminal member 19, so that the terminals 18 and 19 are out of electrical connection and the lights described including the tail light are out of circuit. The upper end 57 of the lever may be conveniently looped upon itself to afford a greater contact surface with the shoe of the driver and the slot 59 is large enough so as to accommodate this loop portion of the lever in any position of the cap 5.

When it is desired to place the lights of the vehicle again in circuit, the switching member 28 may be moved automatically to connect the source of current with one of the contacts of each pair. To accomplish this I provide that when the switch is in the position shown in Figure 4, if the cap 5 be depressed, the crosspiece 6 which straddles the lever 53, will connect with a hump 60 on the lever and throw the upper end 57 of the lever outwardly, so that its foot 52 is thrown into the position shown in Figure 2, when the switch member 28 again bridges the gap 21 and electrically connects the terminal members 19 and 18. At this time the tail light will be on and both the normal and intermediate driving lights will be in circuit. Then, upon release of the cap 5, when the spring 51 will return the follower 36 to outermost position, either, but not both, of the normal driving lights or the intermediate driving lights will be in circuit, depending upon the angular position of the wiper 29 when the switch member 28 was first placed in circuit continuing position.

As here shown, the lever 53 is pivoted by means of oppositely disposed integral ears 61 which bear upwardly upon the open bearings 62, these open bearings may be conveniently formed as vertical extensions of slots 63 in the sides of the extension 8 of the turret. The slots 63 are desirably substantially larger than the ears 61, so that the lever, by manipulation, may be inserted in the extension 8 with the ears located in the bearings 62. Obviously, as clearly shown in the drawings, ears will be maintained upon their bearings in either alternate position of the lever by engagement of the switch member 28 at all times with the terminal member 19.

I have thus provided a switch of the so-called push-button type adapted to control a plurality of circuits and provided with automatic means for connecting a source of current therewith.

Obviously, the invention is not limited to the specific details of construction described above for illustration. It is to be understood further that it is not indispensable and all features of the invention be used conjointly, as they may be advantageously employed in various combinations and sub-combinations.

Subject-matter disclosed and not claimed in this application is claimed in my copending applications, Serial No. 568,670, filed October 14, 1931, in which I have broadly claimed the lighting system here disclosed for automotive vehicles.

Having described one embodiment of my invention, I claim:

1. In an electric switch, the combination with a plurality of contacts constituting the terminals of a plurality of electric circuits, of means rotatable in a fixed plane and operable to successively bridge the contacts of the pairs to open and close each of said circuits consecutively, said means being responsive to a member having reciprocal motion, and a spring acting at one end upon the rotatable means to maintain said means in said fixed plane and acting at the other end to tend to cause reciprocation of the member having reciprocal motion.

2. In an electric switch, the combination of a rotatable current conducting bridge, said bridge being operable in a fixed plane, a member reciprocable parallel to the axis of the member, and means for transforming the reciprocable movement of the member into rotary motion to rotate the bridge upon reciprocation in either direction of the member.

3. In an electric switch, the combination with a rotatable current conducting bridge, said bridge being rotatable in a fixed plane, of a plurality of pairs of contacts constituting the terminals of a plurality of electric circuits, said pairs of contacts being grouped about the axis of rotation of the bridge and successively engageable by the bridge upon rotation thereof to successively open and close each of said circuits, and means for rotating the bridge, said means including a member having both rotary and reciprocal motion and another member having reciprocal motion.

4. In an electric switch, the combination with a rotatable current conducting bridge, said bridge being rotatable in a substantially fixed plane, of a plurality of pairs of contacts constituting the terminals of a plurality of electric circuits, said pairs of contacts being grouped about the axis of rotation of the bridge and successively engageable by the rotatable bridge upon rotation thereof to successively open and close each of said circuits, a member reciprocable parallel to the axis of rotation of the rotatable bridge, and means for transforming the movement of the member into rotary motion to partially rotate the bridge successively in the same direction upon reciprocation in both directions of the member.

5. In a unitary switch structure, the combination of a plurality of pairs of contacts, a rotatable current conducting bridge, said pairs of contacts being grouped about the axis of rotation of the bridge, the contacts of a pair being disposed on opposite sides of said axis and the pairs being successively engageable by the bridge upon rotation thereof, a member reciprocable parallel to the axis of rotation of the bridge, means for transforming the movement of the member into rotary motion to rotate the bridge, and switching mechanism for discontinuing a circuit through all of said contacts, said switching mechanism being actuated to circuit closing position automatically upon reciprocation of the member into position to continue a circuit through said contacts.

6. In an electric switch, the combination of fixed contacts disposed radially about a common axis, said contacts having their contacting surfaces in a substantially single plane perpendicular to said axis, a bridge member rotatable in a fixed plane coaxial with said axis and having wiping engagement with the contacts, a push button reciprocable on said axis, and means for transforming reciprocable motion of the push button into rotary motion of the bridge member.

7. In an electric switch, the combination of fixed contacts disposed radially about a common axis, said contacts having their contacting surfaces in a substantially single plane perpendicular to said axis, a bridge member rotatable in a fixed plane coaxial with said axis and having wiping engagement with the contacts, said member having continuous engagement with a pair of diametrically opposite contacts, a push button reciprocable on said axis, and means for transforming reciprocable motion of the push button into rotary motion of the bridge member.

8. In an electric switch, the combination of fixed contacts disposed radially about a common axis, said contacts having their contacting surfaces in a substantially single plane perpendicular to said axis, a bridge member rotatable in a fixed plane coaxial with said axis and having wiping engagement with the contacts, a push button reciprocable on said axis, means for transforming reciprocable motion of the push button into rotary motion of the bridge member, said means including a cam follower between the push button and the bridge member rotatable with respect to the push button and reciprocable with respect to the bridge member; and a cylindrical cam engaged by said follower.

9. In an electric switch, the combination of insulated fixed contacts disposed radially about a common axis in diametrically opposite pairs, of a bridge member rotatable in a fixed plane coaxial with said axis and engageable with said contacts, said bridge member being fixed upon a hollow square shaft, but insulated therefrom, a cam follower having a hollow square shaft open at one end and closed at the other, said open end receiving the first shaft telescopically; a coil spring housed jointly by the first and second mentioned shafts; radial fingers fixed on the follower; a reciprocable plunger telescopically and loosely receiving the follower shaft and abutting the closed end thereof; a turret housing all of said parts and open at its end opposite the contacts through which open end the follower and plunger project in one position of the parts; interengaging shoulders on the follower and plunger limiting movement thereof outwardly of the turret; cam surfaces carried by the turret with which the follower fingers engage to cause rotation of the follower upon reciprocation thereof by the plunger; and a cap telescoping over the turret and follower.

10. In an electric switch, the combination comprising a cylindrical turret; a plunger telescopically received therein; interengaging shoulders on the turret and plunger limiting movement of the plunger outwardly of the turret; a central internal boss on said plunger; a cylindrical cap telescoping over the turret and plunger; a member housed jointly by the plunger and turret, said member having abutting engagement with said boss but otherwise spaced from said plunger and turret; a cam carried on the interior of said turret; and switching means housed by said turret and actuated by said member in cooperation with said cam.

11. In a unitary switch structure, the combination with a metallic casing; of a plurality of pairs of insulated contacts carried thereby; a current conducting bridge rotatable in a fixed plane and engageable selectively with said pairs of contacts by a wiping engagement; a follower reciprocable along the axis of rotation of the bridge, said member being reciprocable with respect to said bridge but keyed to rotate therewith, said bridge being insulated from said follower and casing; a cam carried by the casing for rotating the follower upon reciprocation thereof; a single terminal member carried by the casing, said terminal member being common to all the pairs of contacts; an insulated switch member pivoted in the casing and adapted to electrically connect the terminal member with one contact of each pair of contacts; a depressible cap carried by the casing to reciprocate the follower in one direction; interengaging means on the cap and switch member for actuating the switch member to circuit closing position upon depression of the cap; and a spring carried by the casing for reciprocating the cap and follower in the opposite direction.

12. The structure of claim 11 wherein the switch member is in the form of a spring pressed tapered nose adapted to be wedged in a gap in the terminal member and the said nose is carried by the foot of a floating lever carried by the casing and wherein said lever is disposed vertically of the casing and is provided with a hump engageable with a transverse crosspiece carried by the cap to throw the upper end of the lever outwardly of a slot in the casing and cap and the said nose into said gap.

HARRY A. DOUGLAS.